United States Patent
Kamiya (10) Patent No.: US 10,697,094 B2
(45) Date of Patent: Jun. 30, 2020

(54) FIBER STRUCTURE AND FIBER REINFORCED COMPOSITE MATERIAL

(71) Applicant: KABUSHIKI KAISHA TOYOTA JIDOSHOKKI, Kariya-shi, Aichi-ken (JP)

(72) Inventor: Ryuta Kamiya, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 109 days.

(21) Appl. No.: 15/754,898

(22) PCT Filed: Aug. 16, 2016

(86) PCT No.: PCT/JP2016/073865
§ 371 (c)(1),
(2) Date: Feb. 23, 2018

(87) PCT Pub. No.: WO2017/038445
PCT Pub. Date: Mar. 9, 2017

(65) Prior Publication Data
US 2018/0251918 A1  Sep. 6, 2018

(30) Foreign Application Priority Data
Aug. 28, 2015  (JP) ................. 2015-169580

(51) Int. Cl.
*D03D 1/00*  (2006.01)
*D03D 15/00*  (2006.01)
(Continued)

(52) U.S. Cl.
CPC ............... *D02G 3/38* (2013.01); *B29C 70/24* (2013.01); *D03D 1/00* (2013.01); *D03D 11/00* (2013.01);
(Continued)

(58) Field of Classification Search
CPC ........ B29C 70/24; D02G 3/38; D03D 13/004; D03D 1/00; D03D 15/0011;
(Continued)

(56) References Cited

U.S. PATENT DOCUMENTS

2013/0104515 A1  5/2013  Heitmann et al.

FOREIGN PATENT DOCUMENTS

GB  2032476  *  5/1980
JP  63-066362 A  3/1988
(Continued)

OTHER PUBLICATIONS

International Preliminary Report on Patentability with translation of Written Opinion in International Application No. PCT/JP2016/073865 dated Mar. 6, 2018.
(Continued)

*Primary Examiner* — Camie S Thompson
(74) *Attorney, Agent, or Firm* — Sughrue Mion, PLLC (57) ABSTRACT

A fiber structure includes a first fiber layer including first reinforcement fiber bundles extending in a first yarn main axis direction, a second fiber layer including second reinforcement fiber bundles extending in a second yarn main axis direction that is orthogonal to the first yarn main axis direction, and auxiliary yarns that join the first fiber layer with the second fiber layer in a stacking direction of the first fiber layer and the second fiber layer. At least either one of the first reinforcement fiber bundles and the second reinforcement fiber bundles each include a core yarn and a covering yarn spirally wound around the core yarn. A covering angle, which is an orientation angle of the covering yarn, corresponds to a direction that differs from the first yarn main axis direction and the second yarn main axis direction.

7 Claims, 4 Drawing Sheets

(51) Int. Cl.
    *D03D 11/00*    (2006.01)
    *D03D 13/00*    (2006.01)
    *B29C 70/24*    (2006.01)
    *D04H 3/10*     (2012.01)
    *D02G 3/38*     (2006.01)

(52) U.S. Cl.
    CPC ....... *D03D 13/004* (2013.01); *D03D 15/0011* (2013.01); *D03D 15/0027* (2013.01); *D03D 15/0094* (2013.01); *D04H 3/10* (2013.01); *D10B 2101/06* (2013.01); *D10B 2101/12* (2013.01); *D10B 2331/021* (2013.01); *D10B 2403/0241* (2013.01); *D10B 2505/02* (2013.01)

(58) Field of Classification Search
    CPC ......... D03D 15/00271; D03D 15/0094; D04H 3/10; D10B 2331/021; D10B 2101/12; D10B 2101/06; D10B 2505/02; D10B 2403/0241

USPC ...................................................... 428/292.1
    See application file for complete search history.

(56)         References Cited

FOREIGN PATENT DOCUMENTS

JP         2512467 Y2    10/1996
    JP       2002-105798 A    4/2002
    JP       2013-531138 A    8/2013

OTHER PUBLICATIONS

International Search Report for PCT/JP2016/073865, dated Nov. 15, 2016 (PCT/ISA/210).

* cited by examiner

FIBER STRUCTURE AND FIBER REINFORCED COMPOSITE MATERIAL

CROSS REFERENCE TO RELATED APPLICATIONS

This application is a National Stage of International Application No. PCT/JP2016/073865 filed Aug. 16, 2016, claiming priority based on Japanese Patent Application No. 2015-169580, filed Aug. 28, 2015.

TECHNICAL FIELD

The present invention relates to a fiber structure including a first fiber layer and a second fiber layer that are joined with each other in a stacking direction and to a fiber-reinforced composite including the fiber structure.

BACKGROUND ART

A fiber-reinforced composite (hereinafter referred to as composite) is used as a material that is lightweight and has high strength. The composite is synthesized by impregnating reinforcement fibers with a matrix resin to improve the dynamic properties (mechanical properties) as compared with when the matrix resin is used solely. Thus, the composite is used as a preferable structural component.

Figure 7:
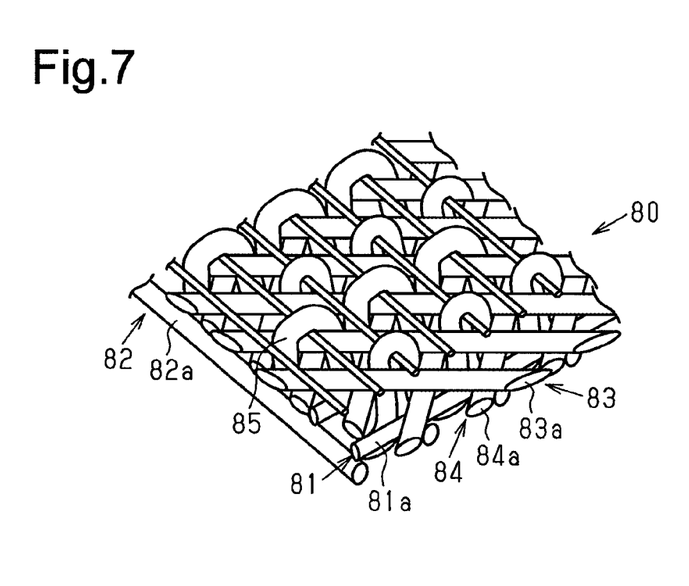
FIG. 7 is a diagram showing a prior art five-axis three-dimensional fabric.

For example, a fiber structure serving as a reinforcement base of a composite includes a stack of a plurality of fiber layers, each of which includes an arrangement of reinforcement fiber warps or wefts, and auxiliary yarns, which join the fiber layers in the stacking direction. Further, in order to exhibit dynamic properties in directions other than the main axis directions of the warps and the wefts (directions in which yarns extend), there may be cases in which the composite includes, in addition to the warp layers and weft layers, fiber layers of bias direction yarns arranged so that the main axis direction extends in a direction that differs from main axis directions of the warps and wefts. For example, as shown in FIG. 7, a five-axis three-dimensional fabric 80 of patent document 1 includes a warp layer 81 that is an arrangement of a plurality of warps 81a, a weft layer 82 that is an arrangement of a plurality of wefts 82a, and two bias yarn layers 83 and 84. The layers are stacked and joined together by vertical yarns 85 in the stacking direction. First bias yarns 83a of one of the bias yarn layers 83 are inclined relative to the warps 81a by a fixed angle, and second bias yarns 84a of the other one of the bias yarn layers 84 are inclined relative to the warp 81a by a fixed angle in the direction opposite to the first bias yarn 83a. In the five-axis three-dimensional fabric 80, the two types of the bias yarns 83a and 84a extend in directions other than the main axis direction of the warp 81a and the main axis direction of the weft 82a. This improves the dynamic properties in the direction in which the bias yarns 83a and 84a extend.

PRIOR ART DOCUMENT

Patent Document

Patent Document 1: Japanese Laid-Open Patent Publication No. 2002-105798

SUMMARY OF THE INVENTION

Problems that are to be Solved by the Invention

When the five-axis three-dimensional fabric 80 is pulled and shaped in the yarn main axis direction of the first bias yarns 83a, the second bias yarns 84a limits shear deformation of the five-axis three-dimensional fabric 80. This deforms the second bias yarns 84a in a contraction direction and causes the second bias yarn 84a to meander. Thus, the dynamic properties are adversely affected in the yarn main axis direction of the bias yarns 84a of the composite that uses the five-axis three-dimensional fabric 80 as a reinforcement base.

It is an object of the present invention to provide a fiber structure and a fiber-reinforced composite that limits adverse effects in the dynamic properties when the fiber structure and fiber-reinforced composite are shaped.

Means for Solving the Problem

A fiber structure that solves the above problem includes a first fiber layer including a plurality of first reinforcement fiber bundles arranged to extend in a first yarn main axis direction, a second fiber layer including a plurality of second reinforcement fiber bundles arranged to extend in a second yarn main axis direction that is orthogonal to the first yarn main axis direction, and auxiliary yarns that intersect the first reinforcement fiber bundles and the second reinforcement fiber bundles. The auxiliary yarns join the first fiber layer with the second fiber layer in a stacking direction of the first fiber layer and the second fiber layer. At least either one of the first reinforcement fiber bundles and the second reinforcement fiber bundles each include a core yarn formed by a reinforcement fiber and a covering yarn formed by a reinforcement fiber spirally wound around the core yarn. A covering angle, which is an orientation angle of the covering yarn relative to the core yarn, corresponds to a direction that differs from the first yarn main axis direction and the second yarn main axis direction and exhibits dynamic properties in a fiber-reinforced composite that uses the fiber structure as a reinforcement base.

A fiber-reinforced composite that solves the above problem obtained by impregnating a fiber structure with a matrix resin is provided. The fiber structure includes a first fiber layer including a plurality of first reinforcement fiber bundles arranged to extend in a first yarn main axis direction, a second fiber layer including a plurality of second reinforcement fiber bundles arranged to extend in a second yarn main axis direction that is orthogonal to the first yarn main axis direction, and auxiliary yarns that intersect the first reinforcement fiber bundles and the second reinforcement fiber bundles. The auxiliary yarns join the first fiber layer with the second fiber layer in a stacking direction of the first fiber layer and the second fiber layer. At least either one of the first reinforcement fiber bundles and the second reinforcement fiber bundles each include a core yarn formed by a reinforcement fiber. A covering yarn formed by a reinforcement fiber spirally wound around the core yarn, and a covering angle, which is an orientation angle of the covering yarn relative to the core yarn, corresponds to a direction that differs from the first yarn main axis direction and the second yarn main axis direction and exhibits dynamic properties in the fiber-reinforced composite.

EMBODIMENTS OF THE INVENTION

One embodiment of a fiber structure and a fiber-reinforced composite will now be described with reference to FIGS. 1 to 4.

Figure 2:
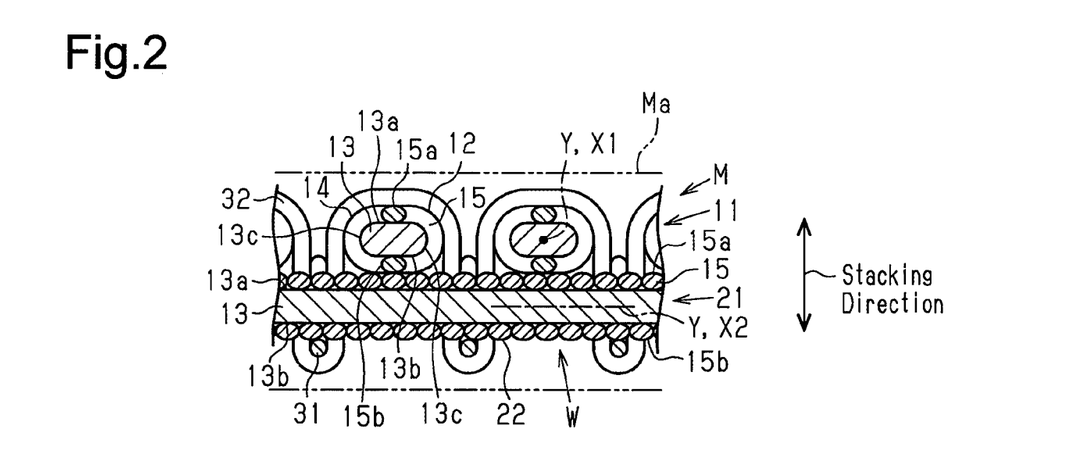
FIG. 2 is a schematic cross-sectional view showing a fiber-reinforced composite including the fiber structure shown in FIG. 1.

Referring to FIG. 2, a fiber-reinforced composite M is formed by impregnating a fiber structure W that forms a reinforcement base with a matrix resin Ma.

Figure 1:
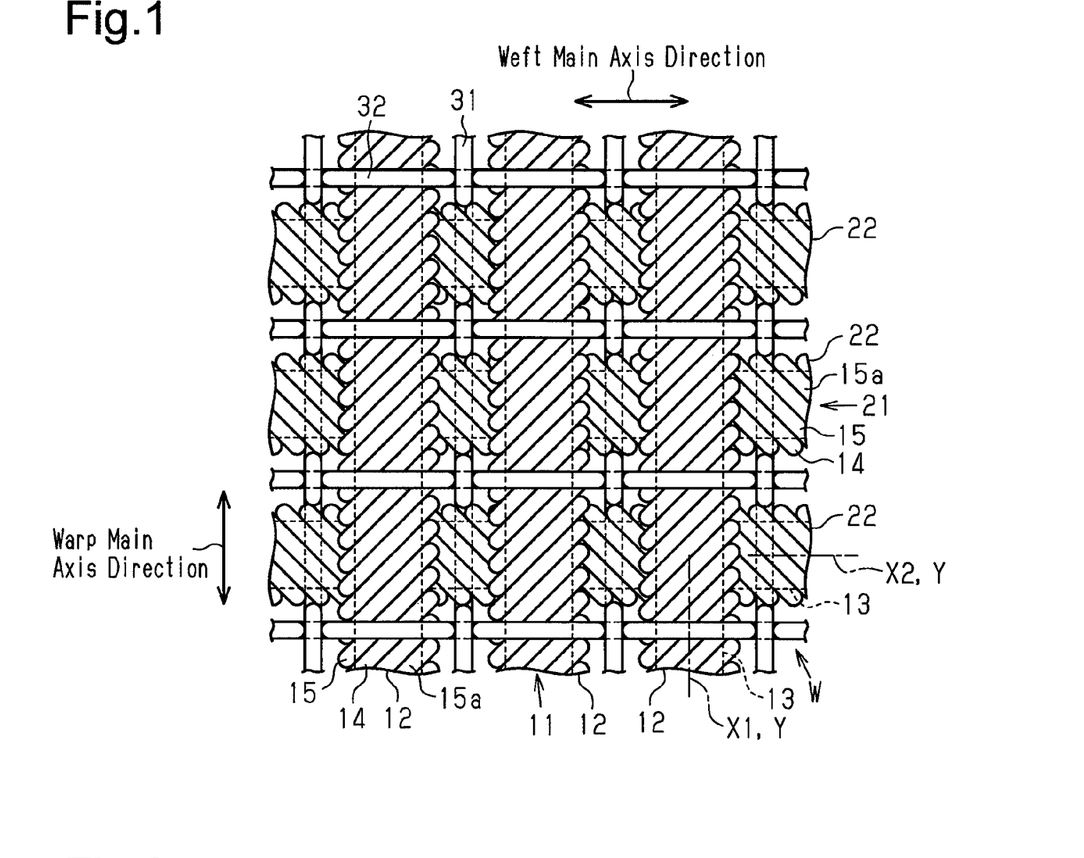
FIG. 1 is a schematic plan view showing one embodiment of a fiber structure.

As shown in FIGS. 1 and 2, the fiber structure W is formed by joining a first fiber layer 11 and a second fiber layer 21 with first auxiliary yarns 31 and second auxiliary yarns 32. In the fiber structure W, the direction in which the first fiber layers 11 and the second fiber layers 21 are stacked is referred to as the stacking direction. In the fiber layers 11 and the second fiber layers 21, a direction parallel to the stacking direction is referred to as the thickness-wise direction, and the dimension parallel to the thickness-wise direction is referred to as the thickness.

As shown in FIG. 1, the first fiber layer 11 is formed by an arrangement of a plurality of warps 12 serving as first reinforcement fiber bundles. In the first fiber layer 11, the direction in which a warp main axis X1 of the warps 12 extends is referred to as the warp main axis direction. Further, in the fiber structure W, the warp 12 has an orientation angle of 0°.

The second fiber layer 21 is formed by an arrangement of a plurality of wefts 22 serving as second reinforcement fiber bundles. In the second fiber layer 21, the direction in which a weft main axis X2 of the wefts 22 extends is referred to as the weft main axis direction. In the fiber structure W, the weft main axis direction (weft main axis X2) intersects the warp main axis direction (warp main axis X1) at an angle of 90°, and the orientation angle of the weft 22 in the fiber structure W is 90° that is orthogonal to the warp main axis direction of the warp 12.

The first auxiliary yarns 31 are each arranged between adjacent ones of the warps 12. Further, the first auxiliary yarn 31 intersects the wefts 22 and the second auxiliary yarns 32. The second auxiliary yarns 32 are each arranged between adjacent ones of the wefts 22 and intersect the first auxiliary yarns 31 and the warps 12. As a result, the first auxiliary yarns 31 and the second auxiliary yarns 32 join the warps 12 with the wefts 22 and join the first fiber layer 11 with the second fiber layer 21 in the stacking direction.

The warps 12 and the wefts 22 will now be described.

As shown in FIG. 2, each of the warps 12 and the wefts 22 includes a core yarn 13, which is formed by reinforcement fibers, and a plurality of covering yarns 14, which are formed by reinforcement fibers. The covering yarns 14 cover the core yarn 13. Each of the core yarns 13 and the covering yarns 14 is formed by bundling a plurality of reinforcement fibers. The reinforcement fibers that form the core yarn 13 are, for example, carbon fibers, aramid fibers, or glass fibers. Further, the core yarn 13 has a flattened cross section. The core yarn 13 includes two wide surfaces 13a and 13b extending in a longitudinal direction of the core yarn 13. One wide surface 13a is referred to as the first wide surface 13a, and the other wide surface 13b is referred to as the second wide surface 13b. The core yarn 13 includes an arcuate surface 13c that connects the long ends of the wide surfaces 13a and 13b. The yarn main axis direction (yarn main axis Y) of the core yarn 13 in the warp 12 corresponds to the warp main axis direction (warp main axis X1) of the warp 12, and the yarn main axis direction (yarn main axis Y) of the core yarn 13 in the weft 22 corresponds to the weft main axis direction (weft main axis X2) of the weft 22.

Figure 3:
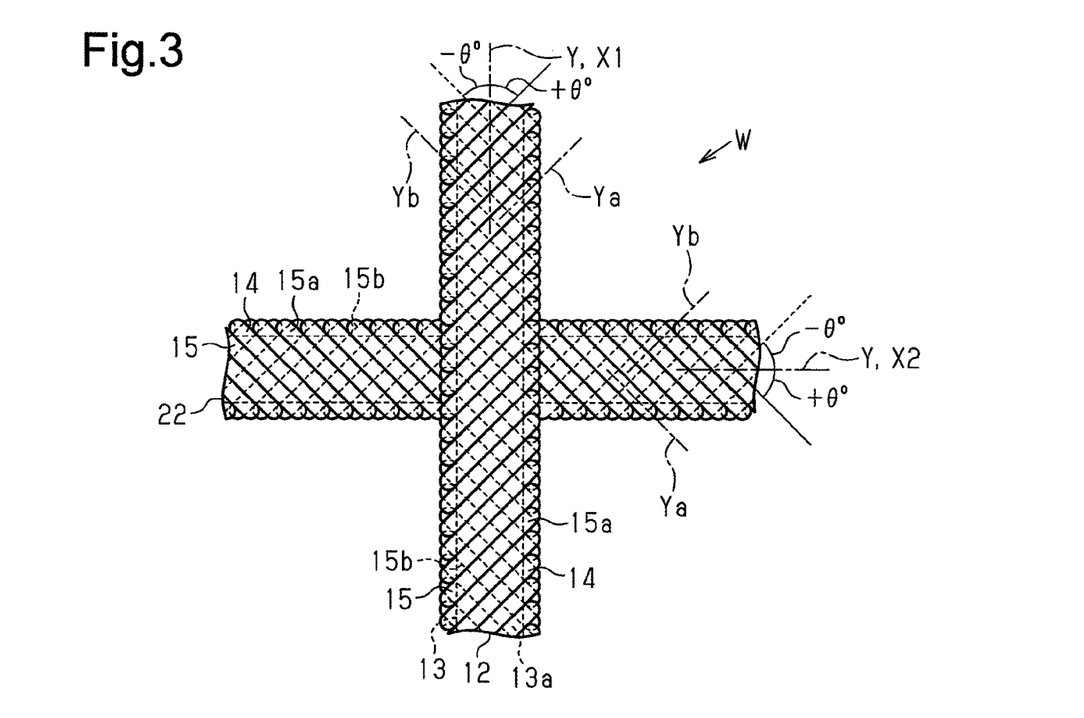
FIG. 3 is a schematic diagram showing a first reinforcement fiber bundle and a second reinforcement fiber bundle included in the fiber structure of FIG. 1.

As shown in FIG. 3, the covering yarn 14 is spirally wound around an outer surface of the core yarn 13. The reinforcement fibers that form the covering yarn 14 are, for example, carbon fibers, aramid fibers, or glass fibers. The covering yarn 14 is wound at a fixed orientation angle θ (covering angle) relative to the yarn main axis direction (yarn main axis Y) of the core yarn 13. The core yarn 13 is covered by a covering layer 15 formed by winding the covering yarn 14. In the present embodiment, the covering angle θ is 45°.

The yarn main axis direction (first cover yarn main axis Ya) of the covering yarn 14 on the first wide surface 13a of the core yarn 13 is referred to as the first cover direction, and the yarn main axis direction (second cover yarn main axis Yb) of the covering yarn 14 on the second wide surface 13b is referred to as the second cover direction. The first cover direction and the second cover direction are symmetrical relative to the yarn main axis Y of the core yarn 13. The covering angle of the first cover yarn main axis Ya relative to the yarn main axis Y of the core yarn 13 is +θ° (+45°), and the covering angle of the second cover yarn main axis Yb relative to the yarn main axis Y of the core yarn 13 is −θ° (−45°). In the fiber structure W, the covering angle θ of the covering yarn 14 corresponds to a direction (+45°, which is first cover direction, and −45°, which is second cover direction) that differs from the orientation of the core yarn 13 (0°, which is warp main axis direction, and 90°, which is weft main axis direction).

The covering layer 15 includes a first cover 15a formed by a portion (layer) of the covering yarn 14 located on the first wide surface 13a of the core yarn 13. The first cover 15a is formed by the covering yarn 14 in which the covering angle relative to the yarn main axis Y is +θ°. Further, the covering layer 15 includes a second cover 15b formed by a portion (layer) of the covering yarn 14 located on the second wide surface 13b of the core yarn 13. The second cover 15b is formed by the covering yarn 14 in which the covering angle relative to the yarn main axis Y is −θ°. Thus, as shown in FIG. 2, in a cross-sectional view of the warp 12 and the weft 22, each of the warp 12 and the weft 22 has a three-layer structure including the core yarn 13, the first cover 15a, and the second cover 15b.

In each of the warp 12 and the weft 22, the volume ratio of the layers of the core yarn 13 and the covering yarn 14 is 2:1:1 for the core yarn 13, the first cover 15a, and the second cover 15b. Thus, in a cross-sectional view of the warp 12 and the weft 22, the thickness ratio of the core yarn 13, the first cover 15a, and the second cover 15b is 2:1:1. Accordingly, the volume ratio of the core yarn 13 and the covering layer 15 is 1:1.

As shown in FIGS. 1 and 3, in the fiber structure W including the warps 12 and the wefts 22, the warp main axis direction is orthogonal to the weft main axis direction. Thus, in the fiber structure W, the yarn main axis direction of the covering yarn 14 in the first cover 15a of the warp 12 and the yarn main axis direction of the covering yarn 14 in the second cover 15b of the weft 22 are the same and both have the same covering angle +θ° (+45°) relative to the warp main axis direction. Further, the yarn main axis direction of the covering yarn 14 in the second cover 15b of the warp 12 and the yarn main axis direction of the covering yarn 14 in the first cover 15a of the weft 22 are the same and both extend at the same covering angle −θ° (−45°) relative to the warp main axis direction.

The fiber structure W is a six-layer structure including a layer of the core yarns 13 (0°) of the warps 12, a layer of the core yarns 13 of the wefts 22 (90°), a layer of the first covers 15a of the warps 12, a layer of the second covers 15b of the wefts 22, a layer of the second covers 15b of the warps 12, and a layer of the first covers 15a of the wefts 22. Further, the layers of the first covers 15a of the warps 12 and the layers of the second covers 15b of the wefts 22 both extend at a covering angle of +45° relative to the warp main axis direction, and the layers of the second covers 15b of the warps 12 and the layers of the first covers 15a of the wefts 22 both extend at a covering angle of −45° relative to the warp main axis direction. Thus, the fiber structure W is a structure including four types of layers having different orientations.

In the entire fiber structure W including the warps 12 and the wefts 22, the volume occupied by the core yarn 13 of the warp 12, the volume occupied by the core yarn 13 of the weft 22, the volume occupied by a portion of the covering yarn 14 extending at a covering angle of +θ° relative to the warp main axis direction, and the volume occupied by a portion of the covering yarn 14 extending at a covering angle of −θ° relative to the warp main axis direction is 1:1:1:1. Thus, the volume ratio of the four types of layers that are respectively oriented at 0°, 90°, +45°, and −45° relative to the warp main axis direction is 1:1:1:1 (i.e., volume of four types of layers having different orientations is the same). Accordingly, the dynamic properties are the same in each direction.

The fiber-reinforced composite M is manufactured by impregnating the fiber structure W with the matrix resin Ma. One example of the manufacturing method for impregnating the fiber structure W with the matrix resin Ma and hardening the fiber structure W is a resin transfer molding (RTM) process. In the RTM process, a liquid thermosetting resin is injected into a resin impregnation mold with the fiber structure W arranged in the mold. For example, an epoxy resin is used as the thermosetting resin. After the thermosetting resin is injected into the mold, the matrix resin Ma is heated and hardened to form the fiber-reinforced composite M.

In the fiber-reinforced composite M, the dynamic properties are improved in four directions, namely, the warp main axis direction in which the core yarn 13 of the warp 12 extends (0°), the weft main axis direction in which the core yarn 13 of the weft 22 extends (90°), the first cover direction of the first cover 15a of the warp 12 and the second cover direction of the second cover 15b of the weft 22 (+45°), and the second cover direction of the second cover 15b of the warp 12 and the first cover direction of the first cover 15a of the weft 22 (−45°). Further, the fiber-reinforced composite M improves in dynamic properties in the same manner and is quasi-isotropic.

The operations of the fiber structure W including the warps 12 and the wefts 22 and the fiber-reinforced composite M will now be described.

Figure 4:
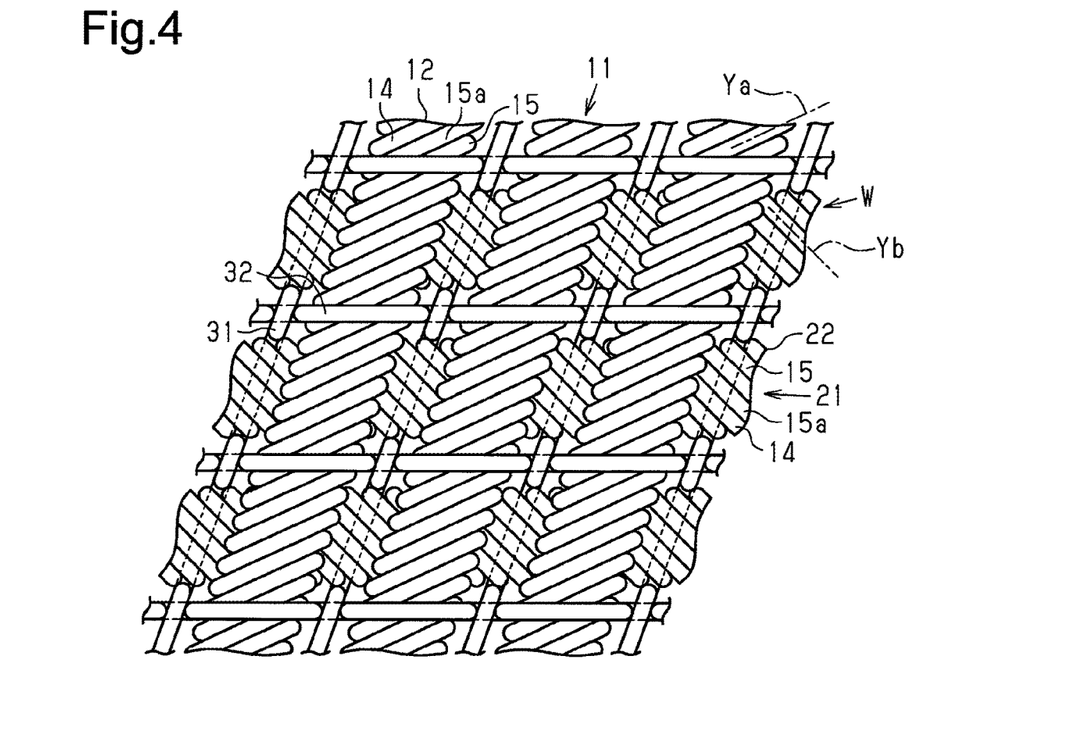
FIG. 4 is a schematic diagram showing the fiber structure of FIG. 1 that has undergone shear deformation.

For example, as shown in FIG. 4, when the fiber structure W is pulled and shaped in the first cover direction in which the first cover yarn main axis Ya of the warps 12 extends, the warps 12 and the wefts 22 follow the pulling and deform. The covering yarns 14 are not stretched in the pulled first cover direction. This restricts meandering and winding shrinkage in the second cover direction that is orthogonal to the pulled direction.

The above embodiment has the advantages described below.

(1) The warps 12 and the wefts 22 are each formed by spirally winding the covering yarn 14 around the core yarn 13. The covering angle of the covering yarn 14 corresponds to the direction (+45°, which is first cover direction, and −45°, which is second cover direction) that differs from the orientations of the core yarns 13 (0°, which is warp main axis direction, and 90°, which is weft main axis direction). By controlling the covering angle of the covering yarn 14 relative to the core yarn 13, the yarn main axis directions of the covering yarns 14 are controlled in a direction that differs from the yarn main axis direction of the warps 12 and the wefts 22. Further, the fiber-reinforced composite M exhibits dynamic properties. Thus, the fiber-reinforced composite M is provided with dynamic properties in directions other than the warp main axis direction of the warp 12 and the weft main axis direction of the weft 22 without using bias direction yarns. Further, since the covering yarn 14 is spirally wound around each core yarn 13, the yarn main axis direction of the covering yarn 14 on the wide surfaces 13a and 13b is symmetrical (positive and negative) relative to the yarn main axis direction of the core yarn 13. In addition, since the covering yarn 14 is wound around each core yarn 13, even if the fiber structure is pulled toward one side in the yarn main axis direction of the covering yarn 14 to shape the fiber structure, the covering yarn 14 oriented toward that side is not stretched. Further, meandering and winding shrinkage are limited in the covering yarn 14 oriented toward the other side in the yarn main axis direction. That is, even when the fiber structure W is shaped, the winding of the covering yarn 14 around the core yarn 13 limits stretching and meandering of the covering yarn 14 and limits the generation of creases. This limits adverse effects in the dynamic properties of the fiber-reinforced composite M using the fiber structure W in the direction in which the covering yarns 14 exhibit the dynamic properties of the fiber-reinforced composite M. Additionally, the yarn main axis direction of the covering yarn 14 on the wide surfaces 13a and 13b corresponds to the direction in which the properties of the fiber-reinforced composite M are improved. Thus, the covering yarn 14 has a high degree of straightness. This increases the effect for improving the dynamic properties in the yarn main axis direction.

(2) The first cover direction and the second cover direction of the covering yarn 14 differ from the warp main axis direction of the warp 12 and the weft main axis direction of the weft 22. Thus, the fiber structure W is a stack of the first fiber layers 11 and the second fiber layers 21, and the covering yarn 14 is oriented in the first cover direction and the second cover direction. This improves the dynamic properties in the first cover direction and the second cover direction without using bias direction yarns.

(3) In each of the warp 12 and the weft 22, the covering angle of the first cover yarn main axis Ya of the covering yarn 14 relative to the yarn main axis Y of the core yarn 13 is +45°, and the covering angle of the second cover yarn main axis Yb of the covering yarn 14 relative to the yarn main axis Y of the core yarn 13 is −45°. Thus, the fiber-reinforced composite M using the fiber structure W includes the wefts 22 intersecting the warps 12 at an angle of 90°, the portions of the covering yarns 14 the warps 12 at an angle of +45°, and the portions of the covering yarns 14 intersecting the warps 12 at an angle of −45°. Accordingly, the fiber-reinforced composite M is quasi-isotropic.

(4) The volume occupied by the core yarns 13 of the warps 12, the volume occupied by the core yarns 13 of the wefts 22, the volume occupied by portions of the covering yarns 14 extending at a covering angle of +θ° relative to the warp main axis direction, and the volume occupied by portions of the covering yarns 14 extending at a covering angle of −θ° relative to the warp main axis direction are the same. Thus, the dynamic properties in the warp main axis direction of the warps 12, the dynamic properties in the weft main axis direction of the wefts 22, the dynamic properties in the direction extending at a covering angle of +θ° relative to the warp main axis direction, and the dynamic properties in the direction extending at a covering angle of −θ° relative to the warp main axis direction are the same. As a result, the elastic properties are the same in the four directions of the fiber-reinforced composite M.

(5) The fiber structure W is formed by joining the first fiber layer 11 including the warps 12 with the second fiber layer 21 including the wefts 22 and can be manufactured using a typical loom. The warps 12 and the wefts 22 include the covering yarns 14. Thus, the fiber structure W manufactured using a typical loom has the same dynamic properties as a fiber structure including bias direction yarns.

The above embodiment may be modified as described below.

In the embodiment, the covering yarn 14 is wound so that the covering layer 15 covering the core yarn 13 is a single layer. Instead, the covering yarn 14 may be wound so that the covering layer covering the core yarn 13 is a double layer.

Figure 5A:
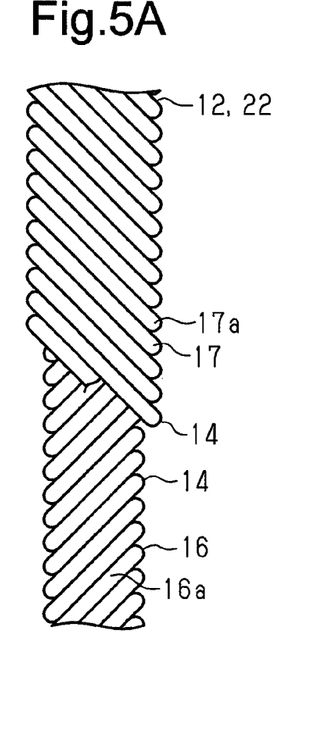
FIG. 5A is a diagram showing another example of a reinforcement fiber bundle.

As shown in FIG. 5A, the warps 12 and the wefts 22 each include the core yarn 13, a first covering layer 16 formed by spirally winding the covering yarn 14 around the core yarn 13, and a second covering layer 17 formed by spirally winding the covering yarn 14 around the first covering layer 16. The winding direction of the covering yarns 14 in the first covering layer 16 is opposite to the winding direction of the covering yarns 14 in the second covering layer 17.

Figure 5B:
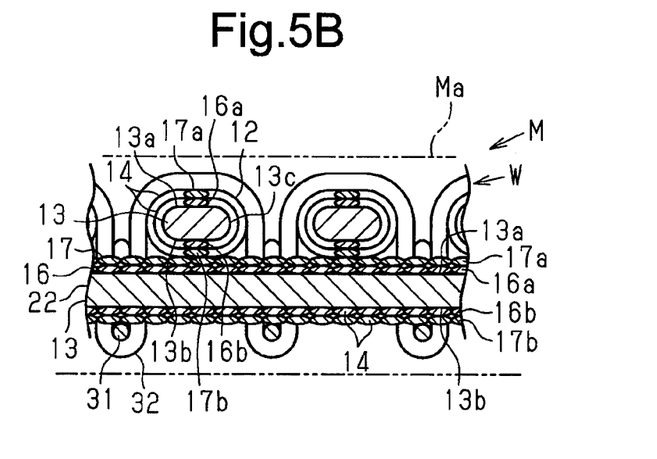
FIG. 5B is a partial, cross-sectional view showing a fiber-reinforced composite including the reinforcement fiber bundle shown in FIG. 5A.

As shown in FIG. 5B, the first covering layer 16 includes a first cover 16a at a portion (layer) located on the first wide surface 13a of the core yarn 13. The first cover 16a is formed by the covering yarn 14 extending at a covering angle of +θ° relative to the yarn main axis Y of the core yarn 13. Further, the first covering layer 16 includes a second cover 16b at a portion (layer) located on the second wide surface 13b of the core yarn 13. The second cover 16b is formed by the covering yarn 14 extending at a covering angle of −θ° relative to the yarn main axis Y of the core yarn 13.

The second covering layer 17 includes a first cover 17a at a portion located on the first cover 16a of the first covering layer 16. The first cover 17a is formed by the covering yarn 14 extending at a covering angle of −θ° relative to the yarn main axis Y of the core yarn 13. Further, the second covering layer 17 includes a second cover 17b at a portion located on the second cover 16b. The second cover 17b is formed by the covering yarn 14 extending a covering angle of +θ° relative to the yarn main axis Y of the core yarn 13.

Thus, in a cross-sectional view of the warps 12 and the weft 22, each of the warp 12 and the weft 22 has a five-layer structure including the core yarn 13, the first cover 16a and the second cover 16b of the first covering layer 16, and the first cover 17a and the second cover 17b of the second covering layer 17.

Further, in each of the warp 12 and the weft 22, the volume ratio (thickness ratio) of the core yarn 13 and the layers of the covering yarn is 4:1:1:1:1 for the first cover 16a, the second cover 16b, the first cover 17a, and the second cover 17b. Thus, the volume ratio of the core yarn 13 and the two covering yarns 14 (first covering layer 16 and second covering layer 17) is 1:1. Further, the core yarn 13 and the covering yarn 14 are formed by the same reinforcement fibers. Accordingly, the dynamic properties in the warp main axis direction of the warp 12, the dynamic properties in the weft main axis direction of the weft 22, the dynamic properties in the direction extending at a covering angle of +θ° relative to the warp main axis direction, and the dynamic properties in the direction extending at a covering angle of −θ° relative to the warp main axis direction are the same.

As shown in FIGS. 5A and 5B, the winding direction of the covering yarn 14 in the first covering layer 16 is opposite to the winding direction of the covering yarn 14 in the second covering layer 17. Instead, in a structure in which the core yarn 13 is covered by the first covering layer 16 and the second covering layer 17, the first covering layer 16 and the second covering layer 17 may be wound in the same direction.

Figure 6:
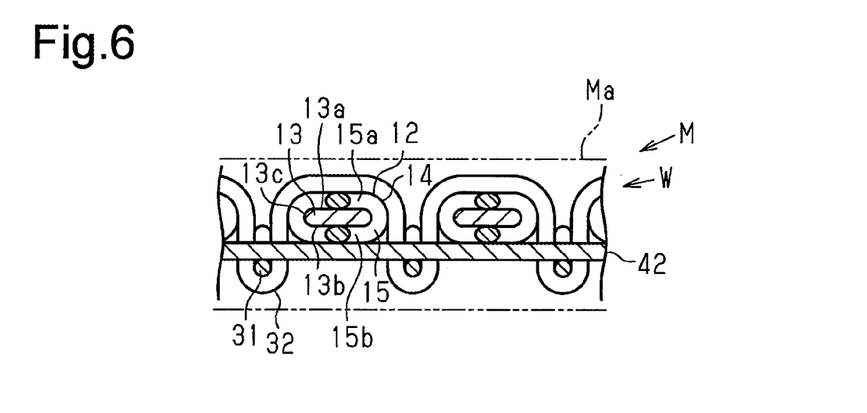
FIG. 6 is a partial, cross-sectional view showing a further example of a fiber-reinforced composite bundle.

As shown in FIG. 6, each warp 12 may include the yarn 13 and the covering yarn 14, and a weft 42 may include only the reinforcement fiber bundle that is less the covering yarn 14.

In this case, the volume ratio of the core yarn 13 of the warp 12 and the weft 42 is 1:1, and the core yarn 13 of the warp 12 has the same thickness as the weft 42. Further, the volume ratio (thickness ratio) of the core yarn 13 of the warp 12, the first cover 15a, and the second cover 15b is 1:1:1. As a result, the volume ratio of the first cover 15a and the second cover 15b and the other portions (core yarn 13 of warp 12 and weft 42) is 1:1.

The warp 12 and the weft 22 may have different covering angles.

The covering angles of the warp 12 and the weft 22 are not limited to ±45° and may be, for example, 60°.

The cross section of the core yarn 13 does not have to be flattened and may be circular. In this case, as compared with the embodiment in which the cross section of the core yarn 13 is flattened, the effect for improving dynamic properties in the direction of a covering angle θ decreases. Thus, it is preferred that the covering layer 15 have a larger volume ratio than the layer of the core yarn 13.

The invention claimed is:

1. A fiber structure comprising:
   a first fiber layer including a plurality of first reinforcement fiber bundles arranged to extend in a first yarn main axis direction;
   a second fiber layer including a plurality of second reinforcement fiber bundles arranged to extend in a second yarn main axis direction that is orthogonal to the first yarn main axis direction; and
   auxiliary yarns that intersect the first reinforcement fiber bundles and the second reinforcement fiber bundles, wherein the auxiliary yarns join the first fiber layer with the second fiber layer in a stacking direction of the first fiber layer and the second fiber layer,
   wherein each of the respective first and second reinforcement fiber bundles of at least either one of the respective first reinforcement fiber bundles and the second reinforcement fiber bundles include:

a core yarn formed by a first reinforcement fiber, and a covering yarn formed by a second reinforcement fiber spirally wound around the core yarn, and wherein a covering angle, which is an orientation angle of the covering yarn relative to the core yarn, corresponds to a direction that differs from the first yarn main axis direction and the second yarn main axis direction and exhibits dynamic properties in a fiber-reinforced composite that uses the fiber structure as a reinforcement base.

2. The fiber structure according to claim 1, wherein the core yarn has a flattened cross section, and the core yarn includes two wide surfaces extending in a longitudinal direction of the core yarn, wherein portions of the covering yarn that are located on the two wide surfaces are oriented in the different direction.

3. The fiber structure according to claim 1, wherein the first reinforcement fiber bundles and the second reinforcement fiber bundles each include the core yarn and the covering yarn.

4. The fiber structure according to claim 3, wherein in each of the first reinforcement fiber bundles and the second reinforcement fiber bundles, the covering yarn forms a covering layer that covers the core yarn, wherein the covering layer includes a first cover that is formed by a portion of the covering yarn extending at a predetermined covering angle relative to a yarn main axis direction of the core yarn and a second cover that is formed by a portion of the covering yarn extending at an angle that is symmetrical to the predetermined covering angle of the first cover relative to the yarn main axis of the core yarn, and a volume ratio of the core yarn, the first cover, and the second cover is 2:1:1.

5. The fiber structure according to claim 1, wherein each of the plurality of first reinforcement fiber bundles includes the core yarn and the covering yarn.

6. The fiber structure according to claim 5, wherein the covering yarn forms a covering layer that covers the core yarn, wherein the covering layer includes a first cover that is formed by a portion of the covering yarn extending at a predetermined covering angle relative to a yarn main axis direction of the core yarn and a second cover that is formed by a portion of the covering yarn extending at an angle that is symmetrical to the predetermined covering angle of the first cover relative to the yarn main axis of the core yarn, and a volume ratio of the core yarn and the second reinforcement fiber bundle is 1:1, and a volume ratio of the core yarn, the first cover, and the second cover is 1:1:1.

7. A fiber-reinforced composite obtained by impregnating a fiber structure with a matrix resin, wherein the fiber structure includes a first fiber layer including a plurality of first reinforcement fiber bundles arranged to extend in a first yarn main axis direction, a second fiber layer including a plurality of second reinforcement fiber bundles arranged to extend in a second yarn main axis direction that is orthogonal to the first yarn main axis direction, and auxiliary yarns that intersect the first reinforcement fiber bundles and the second reinforcement fiber bundles, wherein the auxiliary yarns join the first fiber layer with the second fiber layer in a stacking direction of the first fiber layer and the second fiber layer, wherein each of the respective first and second reinforcement fiber bundles of at least either one of the respective first reinforcement fiber bundles and the second reinforcement fiber bundles include a core yarn formed by a first reinforcement fiber, and a covering yarn formed by a second reinforcement fiber spirally wound around the core yarn, and wherein a covering angle, which is an orientation angle of the covering yarn relative to the core yarn, corresponds to a direction that differs from the first yarn main axis direction and the second yarn main axis direction and exhibits dynamic properties in the fiber-reinforced composite.

* * * * *